United States Patent [19]

Jacksen et al.

[11] Patent Number: 5,525,801
[45] Date of Patent: Jun. 11, 1996

[54] TWO-COLOR PHOTO-CONDUCTIVE LINEAR DETECTOR

[75] Inventors: Niels F. Jacksen, Cave Creek; Scott B. Sleeper, Phoenix; Robert P. Wise, Avondale; Mark K. Preis, Scottsdale, all of Ariz.

[73] Assignee: Litton Systems, Inc., Woodland Hills, Calif.

[21] Appl. No.: 338,690

[22] Filed: Nov. 14, 1994

[51] Int. Cl.⁶ .............................. G01J 3/51; G01J 5/06; G01J 5/08; H04N 3/14
[52] U.S. Cl. .............. 250/352; 250/339.01; 250/339.02; 250/339.05; 250/208.1; 348/280; 348/272; 348/273; 348/340
[58] Field of Search .......................... 250/352, 339.01, 250/339.02, 339.05, 372, 208.1; 348/280, 272, 273, 340

[56] References Cited

U.S. PATENT DOCUMENTS

| | | | |
|---|---|---|---|
| 4,065,785 | 12/1977 | Adcock et al. | 348/280 |
| 4,821,088 | 4/1989 | Tabei et al. | 348/280 |
| 4,914,299 | 4/1990 | Jungkman et al. | 250/352 |
| 5,149,970 | 9/1992 | Whitney | 250/332 |
| 5,453,618 | 9/1995 | Sutton et al. | 250/334 |

Primary Examiner—Constantine Hannaher
Assistant Examiner—Virgil O. Tyler
Attorney, Agent, or Firm—Poms, Smith, Lande & Rose

[57] ABSTRACT

An infrared line-scanning detector includes a scanner having an optical system, infrared linear photo-conductive detector providing an analog image signal, cooler, and conversion electronics for converting the image signal from the detector to digital electrical and digitally-encoded optical formats, all on a moving scanning platform of the scanner. The digitally-encoded optical format of the image signal takes the form of an encoded light beam which is beamed off of the moving scanning platform to a receiver on the stationary portion of the scanner. From the scanner, the image signal is transmitted in the optical format over a fiber optic cable to a reformatting, processing, analysis, and display portion of the imager. This latter portion of the imager allows the image signal to be converted once again to digital electronic format for processing, pattern recognition, image enhancement, storage, delayed display and comparison, and display in near-real time if desired.

29 Claims, 3 Drawing Sheets

TWO-COLOR PHOTO-CONDUCTIVE LINEAR DETECTOR

BACKGROUND OF THE INVENTION

1. Field of the Invention

The present invention is in the field of electronic detector devices. More particularly, the present invention is in the field of infrared linear photoconductive detector devices which provide an electrical output signal indicative of infrared radiation falling on the detector. For example, such detectors may be used to provide an image of a scene illuminated with or radiating infrared light. Alternatively, such detectors may be used to provide an electrical signal indicative of a parameter or value of a process, or of the product of a process. Such a use might include monitoring the temperature at which a process is operating, or the temperature or other parameter of the product of a process at a particular location of the process. The degree to which the product transmits, reflects, absorbs, or otherwise alters infrared light at a particular location in a manufacturing process might also be used as an indicator of the correctness of the process, or quality level of the product as it is produced. Accordingly, such sensors may be used to monitor and correct a continuous process without the need for allowing product of the process to complete processing before measurements of the product can be taken.

2. Related Technology

Conventional infrared detectors are known which are responsive to different colors, or wavelengths, of infrared light. As used herein, different "color" is intended to denote different wavelength, or frequency, of light or electromagnetic radiation, whether or not this light may be viewed with the unaided human eye. Accordingly, differing "color" is used to mean differing wavelength of invisible infrared radiation or light also. Further to the above, conventional sensors are known which will provide a distinct output signal in response to infrared light in either one of at least two different wavelength bands. One conventional way of providing such conventional infrared detectors involves providing individual detector portions or elements of the detector, which detector portions themselves are responsive to different wavelengths of light. These conventional detectors include so called "diced" detector elements, each of which is fabricated from one of two different materials, such as PbSe and PbS. These materials have differing responses to infrared radiation having differing wavelengths. The conventional detectors of this type are referred to as "diced" because the detector elements themselves are fabricated on a substrate, and thereafter are cut or diced into individual detector element pieces, either from the substrate or along with a portion of the substrate. These diced detector elements are then combined with one another into a single detector structure. Adjacent detector rows of detector elements in the completed detector, for example, are fashioned of the differing materials having differing responses to infrared radiation of selected wavelengths.

Another conventional way of providing a detector having two or more differing response characteristics to infrared light having differing wavelengths is to provide a detector having an array of detector elements all fabricated of the same material, and also including a segmented filter structure interposed between the detector elements and the light source within the thermal housing of the detector. This segmented filter structure will filter the light reaching some of the detector elements so that these elements have a different response characteristic than the detector elements receiving unfiltered light. However, because such a detector requires a thermal housing to protect it from ambient temperatures and allow it to be chilled at least to near-cryogenic temperatures for best detection response to infrared light, and the segmented filter is disposed within this closed thermal housing, the filter choice made at the time the detector is manufactured is the only one ever available with a particular detector. That is, the filter sealed within the thermal housing can never be changed in order to optimize the detector to a particular operating environment or use without breaking the seal of the housing to gain access to the filter.

Still another conventional way of providing such a detector with two or more different response characteristics is to provide a detector array on which two or more optical band pass coatings (filters) are directly deposited onto the detector elements of the detector. This fabrication process usually requires two separate optical interference deposition processes, one for each of the filter coatings applied to the array. Again, the filters are sealed within a thermal housing and can never be changed. Also, because the filter material is applied directly to the detector itself as a semiconductor fabrication step or steps, the costs of fabrication of the detector are increased significantly. Also, the risk of detectors being unsatisfactory because of a defect in the filter application steps or steps statistically decreases the yield of good detectors which can be fabricated by this process.

All of the conventional methods of providing such detectors are expensive. Segmented filters cost from $1200 to $10,000 each at current fabrication costs. Diced detectors limit the use of the detector to wavelengths inherent in the material from which the detector is fabricated. Also, the cut-on and cut-off characteristics of detector materials themselves is not as sharp as can be obtained with an optical filter. All of the conventional detectors do not allow the wavelength response bands of the detector to be altered after the detector is completed. That is, the filters or detector material of the detector are set at the time of manufacture and can not thereafter be altered. All of these conventional detector structures are labor intensive to make, and require additional processing steps which increase the scrap rate of defective detectors. Accordingly, all of the conventional two-color detectors are costly. Also, these conventional detectors are limited to the colors selected for the materials of construction used during their manufacture. The color range for response of the conventional detectors can not be changed after they are manufactured.

SUMMARY OF THE INVENTION

In view of the deficiencies of the conventional technology, a primary object of this invention is to avoid one or more of these deficiencies.

An additional object for this invention is to provide a two-color detector which has externally mounted and easily changed color filters.

Still another object for this invention is to provide such a two-color detector which includes optical divider means for preventing spectral cross talk between a portion of the detector responding to one color of incident light, and a portion of the detector responding to another color of incident light, as determined by the colors of filters provided in association with the detector.

Accordingly, the present invention provides a two-color detector including a linear array of at least two spaced apart parallel rows of plural detector elements, each detector element of the plural detector elements providing a corresponding one of plural electrical signals indicative of electro-magnetic radiation falling thereon, means for dividing electro-magnetic radiation falling upon the detector into at least two frequency bands, and an optical divider interposed between the two spaced apart parallel rows of plural detector elements, the optical divider including means for preventing radiation of at least one of the two frequency bands from falling upon one of the two spaced apart parallel rows of plural detector elements.

According to another aspect, the present invention provides a method of providing a two-color detector which is responsive to electro-magnetic radiation incident thereon in two different color bands of wavelength for the radiation, the detector providing respective electrical output signals indicative of electromagnetic radiation falling on the detector in each of the two color bands, the method comprising steps of providing a detector chip having a linear array of multiple detector elements arranged in two spaced apart parallel adjacent rows each of plural detector elements, using the detector elements of the detector chip to provide respective electrical output signals in response to electromagnetic radiation falling thereon, enclosing the detector chip within a closed housing, providing a window portion of the housing which is transparent to electro-magnetic radiation causing the electrical response of the detector elements, providing a two-color filter assembly disposed outwardly of the window portion, directing electro-magnetic radiation through the two-color filter assembly to provide a pair of electro-magnetic radiation beams each of a respective wavelength color band, and directing the pair of radiation beams through the window portion and onto the detector elements of the detector chip so that substantially only a respective single color of radiation beam falls upon each respective one of the two spaced apart rows of detector elements.

The present invention further provides an infrared scanning detector of low cost and rugged construction suitable for use in a variety of industrial environments.

Additional objects and advantages of the present invention will be apparent from a reading of the following detailed description of several exemplary preferred embodiments of the present invention, taken in conjunction with the appended drawing Figures, in which the same reference numeral refers to the same structural element, or to elements which are analogous in structure or function.

DETAILED DESCRIPTION OF AN EXEMPLARY PREFERRED EMBODIMENT OF THE INVENTION

Figure 1:
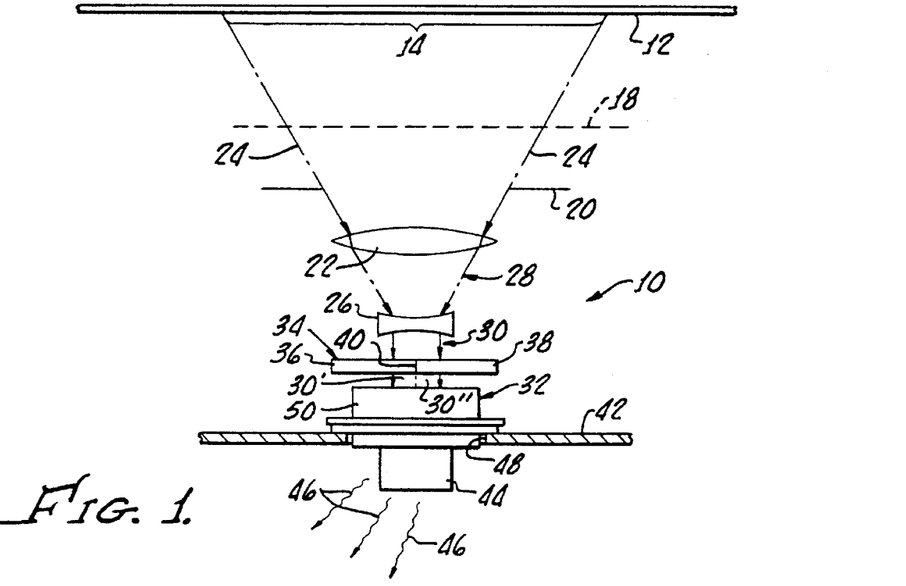
FIG. 1 provides a schematic view of a detector assembly embodying the present invention.

Viewing FIG. 1, a detector assembly, generally referenced with the numeral 10, views a relatively moving scene 12. The scene 12 is depicted as though it were a plane moving from left to right relative to the detector 10 (relative movement of the scene being indicated by arrow 16), although this relative movement need not be the physical case. That is, the scene 12 may be part of the world at large. For example, the scene 12 may be a viewed part of the world around an industrial security camera which includes the detector 10, and which is installed atop a pole in a parking lot, or in a manufacturing facility. However, because of the relative movement of the detector assembly 10 and scene 12, a view 14 (or portion of the scene 12), passes before the detector assembly 10, as is indicated by arrow 16. Those ordinarily skilled in the pertinent arts will understand that either the detector assembly 10 or scene 12, or both, may be relatively moving. Alternatively, neither the detector assembly 10 or scene 12 need be moving or relatively moved, but instead a scanner optical device (schematically indicated by dashed line 18) may be interposed between the scene 12 and the detector assembly 10 so that portions of the scene are sequentially scanned in the view 14 of the detector assembly 10.

Importantly, the detector assembly 10 includes an iris 20 and objective lens 22, which in cooperation determine the size of the scene 14 viewed by the detector assembly 10. Light from the view 14, as is indicated by arrows 24, passes through the iris 20 and objective lens 22. A collimating lens 26 receives the resulting convergent cone of light 28 from the lens 22, and provides a collimated beam of light 30 to a detector portion 32. Prior to reaching the detector portion 32, the collimated beam of light 30 passes through a color filter assembly 34. This color filter assembly 34 includes abutting first and second filter portions 36, and 38, respectively. A straight abutment line of demarcation 40 between the filter portions 36, 38 is arranged perpendicular to the direction of relative movement of the view 14 across the detector portion 32. That is, light 24, 28, 30 from a particular part of the scene 14 will first fall upon and pass through the first filter portion 36 before subsequently falling upon and passing through the second filter portion 38. Each of the filter portions 36, 38 has a different spectral transmission band of light frequencies, wavelengths, and colors. Consequently, the detector portion 32 receives portion 30' of the collimated light beam 30, which portion 30' retains a first selected spectral band of light, and also receives a light portion 30" which retains a second selected spectral band of light.

Detector portion 32 includes a circuit board 42, by which the detector portion may be both supported in a housing (not shown), and by which necessary electrical connections to the detector portion 32 may be effected. The detector portion 32 also includes a heat sink and radiator portion 44 extending rearwardly of the circuit board 42. As is illustrated in FIG. 1 (as is indicated by wavy heat arrows 46), and as will be further explained, the heat sink and radiator portion 44 releases heat into the ambient environment. Respective electrical power supply and communication connections with the circuit board 42 are effected, as will be further explained. These electrical connections facilitate both supply of electrical power to the detector portion 32, and communication of control commands to and of output signals from the detector portion 32.

Figure 2:
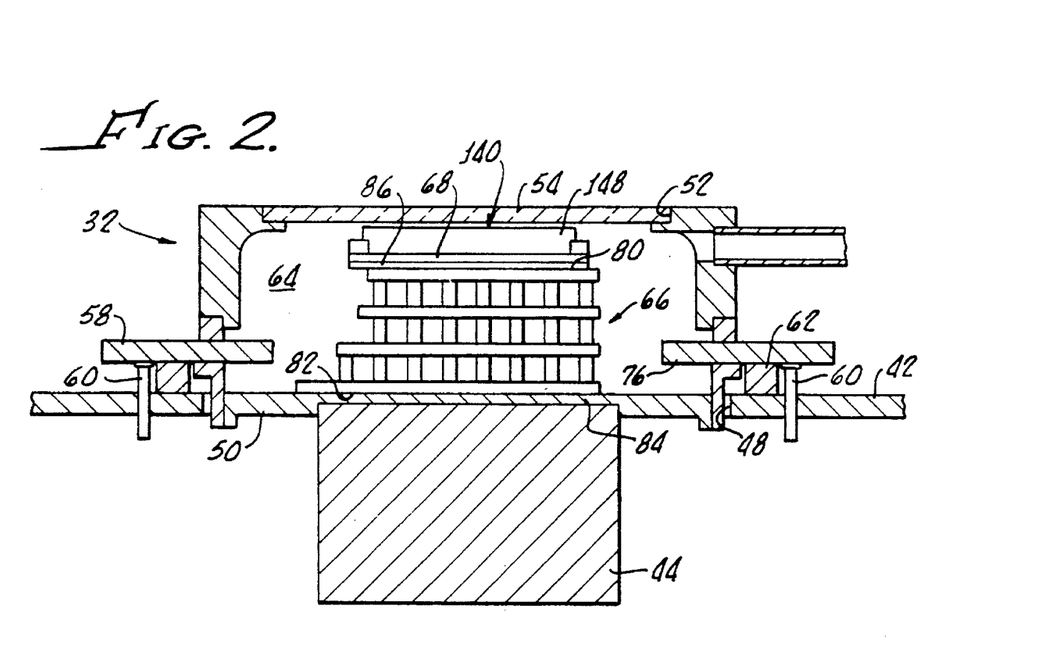
FIG. 2 is an enlarged fragmentary cross sectional view of a portion of the detector assembly seen in FIG. 1.
Figure 3:
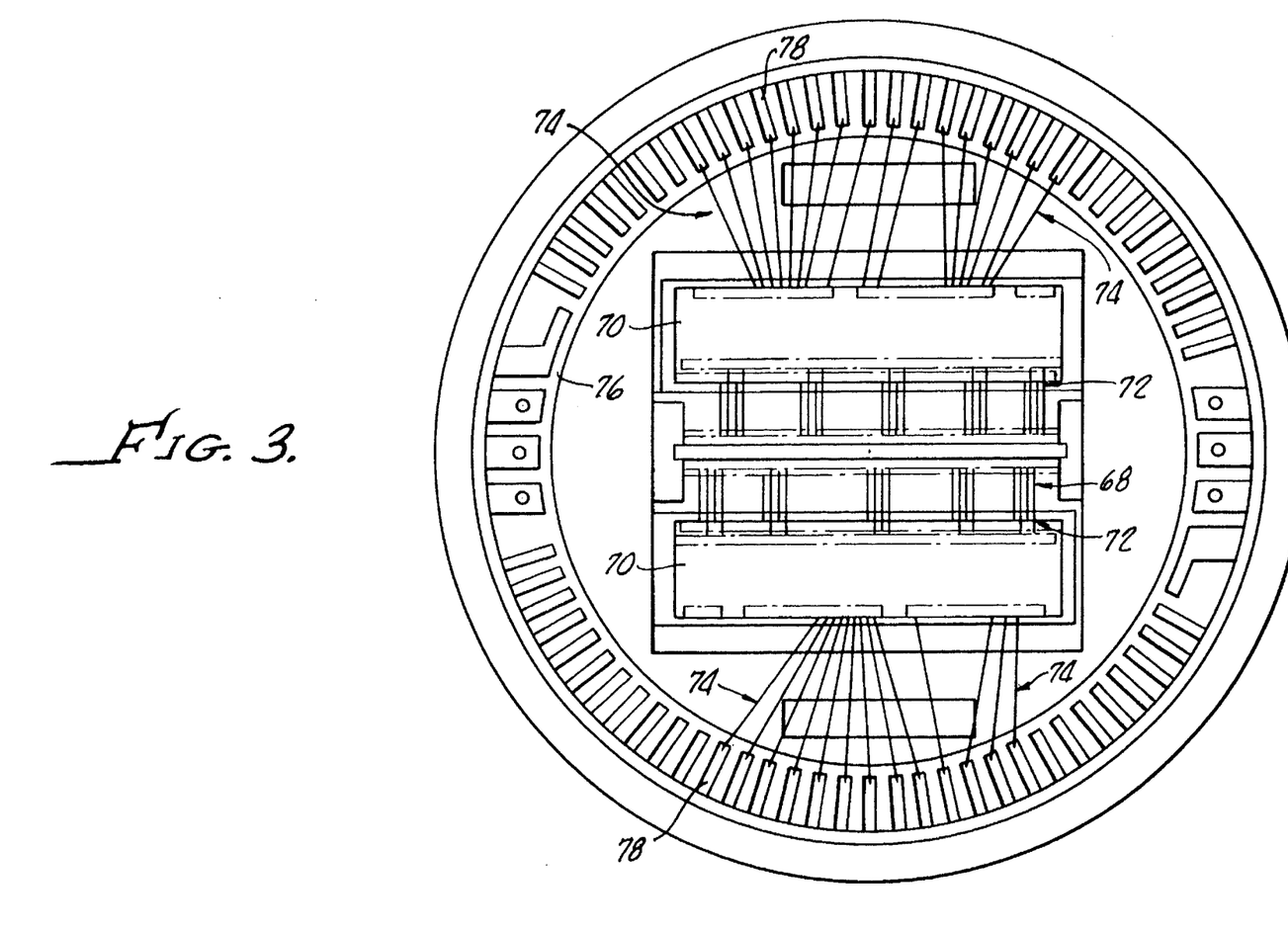
FIG. 3 presents a fragmentary plan view of a detector portion of the detector assembly seen in FIG. 1.

FIGS. 2 and 3 present a respective fragmentary cross sectional elevation view and a plan view of the detector portion 32. FIG. 2 shows that the detector portion 32 is disposed in an opening 48 defined by the circuit board 42. The detector portion 32 includes a thermally-insulative and sealingly closed housing 50, which upwardly defines an opening 52. Into the opening 52 is sealingly received a window member 54. This window member 54 is transparent to infrared radiation, but may be either transparent or opaque to visible light. For purposes of illustration, the window 54 is depicted herein as though it were transparent to visible light. In an actual embodiment of the detector portion 32, a person may or may not be able to view the internal structures of the detector portion 32 through the window 54, dependent upon whether this window is transparent to visible light. As was pointed out above, downwardly from the housing 50, and oppositely to the window 54, depends the heat sink mass 44. For example, the mass 44 may be formed of beryllium oxide. Circumferentially around the housing 50, the detector portion 32 includes an outwardly extending flange portion 58, on which are carried plural depending electrical contact pins 60. The flange portion 58 sets upon circuit board 42 via an interposed mounting ring 62. The contact pins 60 provide electrical interface of the detector portion 32 with the circuit board 42. As was pointed out above, electrical power, and electrical control input and signal output connections are effected with the detector portion 32. Individual ones of the contact pins 60 are uses for these power, control, and signal output connections.

The housing 50 sealingly encloses an evacuated chamber 64 within which is received upon a multi-stage thermoelectric cooler 66, both a photo-conductive lead selenide (PbSe) detector-array chip 68 and a pair of multiplexing circuit chips 70. As depicted, the thermoelectric cooler 66 has three stages. Preferably, the substrate of the detector array chip 68 is fabricated of Z-plane quartz. The multiplexing circuit chips 70 flank the detector-array chip 68. A pair of respective wire bonds 72, each including multiple conductors, extends laterally between the detector-array chip 68 and each of the multiplexing chips 70. Also, a plurality of conductors, generally referenced with the numeral 74, extend from the multiplexing circuit chips 70 outwardly to an annular ceramic feed-through portion 76 of the housing 50, viewing FIGS. 2 and 3. Inwardly of the chamber 64, the ceramic feed-through portion 76 defines plural metallic electrical contact pads 78, to which the conductors 74 are respectively connected individually. Outwardly of the housing 50, the ceramic feed-through portion 76 of the housing defines the flange 58, and carries the depending contact pins 60 in electrical connection individually with corresponding contacts effected on the circuit board 42. The contact pads 78 are in electrical contact individually with the contact pins 60. Thus, the ceramic feed-through portion 76 provides for electrical connection of power and control signals into the housing 50, and of output signals out of this housing.

The thermoelectric cooler 66 includes three cascaded stages of reversed Peltier-effect cooling semiconductor junctions, which move heat from the upper end of the cooler 66 toward the lower end of this cooler when an appropriate voltage and current flow is provided in the cooler 66. Consequently, the upper surface 80 of the cooler 66 becomes very cold, and heat is moved to the lower surface 82 of the cooler, warming this lower surface. The lower surface 82 of the cooler 66 is thermally connected to the heat sink mass 44 through an intervening lower heat-transfer wall 84 of the housing 50. Heat sink mass 44 is exposed to the ambient environment around the detector portion 32, as is indicated by the heat liberation arrows 46, recalling the description of FIG. 1. It will be noted that this heat liberation is effected on a side of circuit board 42 which is opposite to the window 54. Accordingly, heat from the heat sink thermal mass 44 does not warm surrounding structures by convection or radiation to produce unwanted sources of infrared radiation within the view of the window 54. At the upper end of the cooler 66, the upper surface 80 is thermally connected to the detector-array chip 68 via an intervening thermally-conductive synthetic sapphire upper mother board member 86. This upper mother board member 86 also carries the multiplexer circuit chips 70, so that a minimum of wire bond connectors 74 are connected between the circuit chips 70 and the contact pads 78 of the uncooled ceramic ring 58. Understandably, these electrically conductive wire bond conductors 74 are also thermal conductors, and their number is kept to a minimum.

Figure 4:
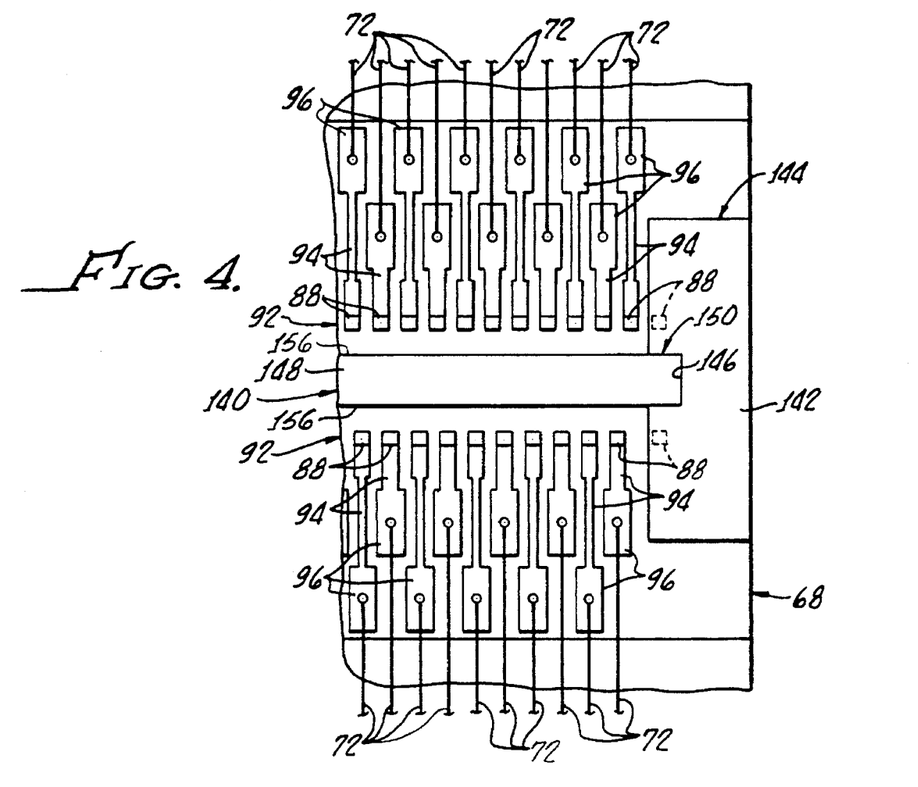
FIG. 4 provides a greatly enlarged fragmentary plan view of a part of the detector portion seen in FIG. 3.

FIG. 4 shows an enlarged fragmentary plan view of an end portion of the detector-array circuit chip 68 seen in FIGS. 2 and 3. As is shown on FIG. 4, the detector-array chip 68 includes a bi-linear array of PbSe photo-conductive detector elements 88, arrayed on opposite sides of a central conductive metallic trace 90 in two rows 92. The detector elements 88 in the rows 92 may be staggered as shown, or may be aligned with one another in pairs on opposite sides of the central trace 90. This conductive trace 90 has a width of about 0.025 inches, while the detector elements 88 are about 0.003 inches square on 0.004 inch centers. Preferably, the detector-array chip seen in FIGS. 3 and 4 includes 256 detector elements 88 arrayed in two spaced apart rows 92, each of 128 detector elements. Also, preferably, the rows 92 of detector elements 88 are spaced apart by a distance of about 0.025 inch. Extending in respectively opposite directions from each of the detector elements 88 in each of the two detector rows 92, are respective conductive traces 94 leading individually to respective contact pads 96. The wire bond conductors 72 connect individually at their inner ends to the contact pads 96, and extend to similar contact pads 98 at the multiplexing circuit chips 70. These contact pads 98 at the multiplexing circuit chips 70 are best seen in FIG. 3.

FIG. 4 also shows that the detector chip 68 includes an elongate fine-dimension optical divider assembly 140. This fine-dimension optical divider assembly 140 is formed of quartz or similar material like the substrate of the detector chip 68. Consequently, the optical divider assembly 140 matches the thermal coefficient of expansion of the substrate of the chip 68. Effectively, the optical divider assembly 140 has the same coefficient of thermal expansion as the detector chip 68 so that no stress or strain is created in either the divider assembly or in the detector chip 68 in response to heating or cooling of the detector chip. Because the detector chip 68 will be thermally cycled many times between ambient and cryogenic temperatures as the detector 10 is turned on and off, and as the detector portion 68 is repeatedly cooled by cooler 66 to be later allowed to warm to ambient temperatures when the detector 10 is turned off, this matching of thermal expansion coefficients is very important.

Figure 5:
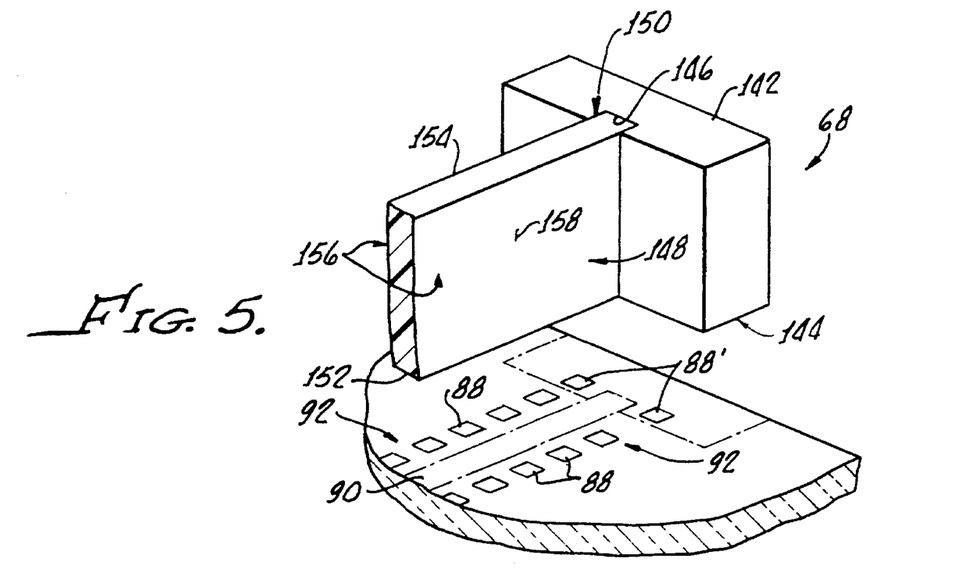
FIG. 5 presents a fragmentary perspective assembly view of the detector portion seen in FIGS. 2–4.

The optical divider assembly 140 includes two end pieces 142 of quartz material which are spaced apart at opposite ends of the rows 90 of detector elements 88. The end pieces 142 are metallized on their lower side and are adhesively attached to the upper surface of the detector chip 68 with a high-strength epoxy adhesive. This metallization and adhesive is too thin to be illustrated in the drawing Figures, but is indicated with the arrowed numeral 144. As FIG. 5 illustrates with a dashed line "foot print" of the end piece 142 on the detector chip 68, preferably at least one of the end pieces 142 overlies a pair of the detector elements 88 at one end of the rows 92 of detector elements. Consequently, because the metallized quartz material of the end pieces 142 is substantially opaque to infrared radiation falling thereon, the covered pair of detector elements 88' are blind to infrared radiation falling on the detector chip 68.

The two "blind" detector elements 88' may be used for calibrating the detector chip 68. Because the PbSe material from which the detector elements 88 are formed has a temperature coefficient of resistivity, the output signal provided by these elements in response to the incidence thereon of infrared radiation is affected by the operating temperature of the detector portion 32. Compensation for the operating temperature of the detector portion 32 can be effected externally in response to sensing of the operating temperature of the detector elements 88 themselves by reference to the signal obtained from the two blind detector elements 88'. Preferably, the detector portion 32 provides a blind detector element for each one of the two rows 92 of detector elements 88. Consequently, a temperature calibration for each side of the detector portion 32 may be effected, which also may be particular to the wavelength of infrared radiation to which the particular side of the detector is responsive. Also, the two "blind" detector elements may be used to provide offset and gain correction signals to outboard electronics.

Further viewing FIGS. 4 and 5, it is seen that each of the end pieces 142 defines a vertical notch 146 confronting the notch of the other of the two end pieces. Fitted into these vertical notches 168 is a fine-dimension elongate optical divider member 148. This divider member 148 is also fabricated from quartz material, and is adhesively bonded to the end pieces, as is indicated by arrowed numeral 150. Preferably, the optical divider member 148 is a little more than one-half inch in length, and is about 0.015 inch thick. A lower edge 152 of the optical divider member 148 sits upon the detector chip 68 in between the rows 92 of detector elements 88. The optical divider element is disposed mid way between the rows 92 of detector elements 88, and is parallel and aligned below the demarcation line 40 between the optical filters 36 and 38. An upper edge 154 of the optical divider member 148 is disposed above the detector elements 88. That is, the optical divider member 148 has a height determined by the internal spacing between the upper surface of the detector chip 68 and the inner surface of the window member 54. The height of the optical divider member 148 is selected so that a minimum practicable gap exists between the surface 154 and the inner surface of the window member. On opposite side surfaces 156, the optical divider member 148 carries metallized reflective optical coatings 158. The coatings 158 are too thin to illustrate in the drawing Figures, but are indicated with arrowed reference numerals. Although the optical divider member 148 is itself a fine-dimension structure, the scale of the detector 32 is such that the member 148 is wall-like, and separates the detector elements 88 on opposite sides thereof.

Because of the optical coatings 158, infrared light which falls upon the upper surface 154 of the divider member 148 is trapped and partially absorbed into the quartz material of the divider member. This quartz material is translucent to the infrared light falling on the detector portion 32. On the other hand, light which is incident upon one or the other side surfaces 156 of the divider member 148 is reflected toward the detector elements 88 on the same side of the divider member 148. That is, light which is incident upon a side surface 156 of the divider member 148 is directed away from the detector elements 88 on the opposite side of the divider member 148. Because the line of demarcation 40 between the filter portions 36, 38, the optical divider member 148, and the rows 92 of detector elements 88 are all parallel with one another with the line 40 and divider member 148 aligned with one another, light passing thorough one of the filter portions 36 or 38 is incident substantially only upon the detector elements 88 on that same side of the divider member 148, and is not at all incident upon the detector elements on the other side of the divider member. Thus, the detector elements 88 on each side of the divider member 148 are responsive only to a single spectral band or color of light, dependent upon the transmission band of the associated filter portion 36 or 38. "Cross talk", or spectral band mixing between the rows 92 of detector elements 88 in the detector portion 32 is virtually eliminated by the divider member 148.

Even though the objective lens 22 and collimating lens 26 provide a complete substantially circular image or view of the scene 12 to the detector portion 32. Only successive narrow line portions of the scene 12 will be used at any one time because of the linear arrangement of the detector rows 92. It should be kept in mind that as the view 14 moves relative to the view scene 12, a relatively narrow portion 160 seen in FIG. 1 is all of the scene which originates light to which the detectors 88 respond. Light from the scene portion 160 falls first on one row 92 of detector elements 88, and then on the other row 92 of detector elements 88. The detector portion 32 receives the infrared radiation from the portion 160 of scene 12, and converts this infrared radiation into electrical signals, as will be further explained. The detector portion 32 operates with an effect similar to an observer staring out of a very narrow window of a moving rail road car at scenery passing by. As the rail car moves, the observer completely views the outside scene as a series of narrow scene portions. Similarly, the detector portion 32 views a series of portions 160 adjacent to one another. A complete mosaic view of the scene 12 is thus obtained. However, the detector portion 32 provides output signals from each row 92 of detector elements 88 which provides information from different parts of the spectrum. That is, the output signals have different color information about the scene viewed by the detector portion 32 because of the differing filters 36, 38.

At the detector elements 88, a bias voltage is applied between the trace 90 and the connector pads 96 so that a bias current always flows through the detector elements 88. These photo-conductive PbSe photo-conductive elements become more conductive in response to infrared radiation so that the bias current level changes in response to the infrared radiation from the scene 12. The information from scene 12 consists of the differences in the levels of current flow between trace 90 and pads 96 as the infrared radiation from the scene 12 sweeps across the detectors 88 in response to relative movement of the detector 10 and scene 12. Because the detector elements 88 on opposite sides of the optical divider member 148 receive infrared radiation from different portions of the spectrum, the electrical current signal responses (or information obtained) at the detector elements 88 on opposite sides of the divider member 148 is commensurately different.

These electrical current signals from the detector elements 88 are passed directly by the wire bond conductors 72 to the associated contact pads of the multiplexing circuit chips 70. At the multiplexing circuit chips 70, the signals conducted from the individual detector elements 88 of the detector-array chip 68 are biased, filtered, and amplified on the multiplexer circuits 70. The voltage at the output of each channel of the multiplexer circuit then represents an electrical analog of the infrared information contained in a particular portion of the scene 12, as contained in a particular portion 160. The voltage levels are then serially transferred onto a common output line (conductor) on each of the multiplexing circuit chips 70 by use of a shift register of the multiplexing circuit. This transfer of voltage-level information about the scene 12 from the multiplexer chips 70 takes place at a high speed, and the channels of these multiplexer circuits are prepared to receive and temporarily store information from the next succeeding line 160 as the relative movement of the detector 10 and scene 12 bring these successive portions 160 of the scene successively across the detector elements 88. The transferred voltage levels are successively converted to parallel-digital format in an analog-to-digital converter, and are converted subsequently to serial-digital format (i.e., to a serial bit stream) in a parallel-to-serial converter, both of which may be located on the mother board 86 as part of the circuits 70.

Each of the multiplexing circuit chips 70 then provides a respective serial digital signal containing the information for the line portions 160 of the scene 12. These multiplexing circuit chips 70 are synchronized in their operation so that they serially handle and output the information from the two rows 92 of detector elements 88. For example, the multiplexing circuit chips 70 can alternate in their operation so that all of the scene information from the detector elements 88 of one of the rows 92 is fed out serially by the associated one of the multiplexing circuit chips 70, and is followed then by the scene information from all of the detector elements 88 of the other row 92 from the other multiplexing circuit chip 70. This alternating of serial bit streams from each of the two rows of detector elements 88 would be repeated for each succeeding line of the scene 12, with a line-synchronizing signal indicating the start or end of the bit stream for each line of the scene. Alternatively, the multiplexing circuit chips 70 can alternate in sequentially providing serial portions of the output signal, which serial portions each represent information from one of the detector elements, to be followed by information from the adjacent detector on the other side of the central conductive trace 90, and so on back and forth in stair-step fashion across the trace 90 and along the length of the bi-linear detector-array chip 68.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A two-color detector comprising:
   a linear array of multiple detector elements arranged in two spaced apart parallel adjacent rows of plural detector elements disposed substantially upon a plane, each detector element of said plural detector elements in response to electro-magnetic radiation falling thereon providing a corresponding one of plural electrical output signals:
   means for dividing electro-magnetic radiation falling upon said detector into two wavelength bands; and
   an optical divider interposed between said two spaced apart parallel rows of plural detector elements, said optical divider including means for preventing radiation of at least one of said two wavelength bands from falling upon one of said two spaced apart parallel rows of plural detector elements.

2. The two-color detector of claim 1 wherein said optical divider comprises a wall-like member interposed between said two spaced apart parallel rows of plural detector elements.

3. The two-color detector of claim 2 wherein said optical divider comprises a pair of spaced apart end members, one of said pair of spaced apart end members being disposed at each end of said two parallel adjacent rows of detector elements, and said pair of end members cooperatively supporting said wall-like optical divider member.

4. The two-color detector of claim 3 wherein each end member of said pair of spaced apart end members defines a slot confronting the other end member of said pair of end members, said wall-like divider member being received into said slots of said pair of end members to extend substantially perpendicularly to said plane upon which said plural detector elements are disposed.

5. The two-color detector of claim 4 wherein each end member of said pair of spaced apart end members is adhesively attached to a substrate which carries said plural detector elements.

6. The two-color detector of claim 4 wherein one of said pair of end members includes an opaque layer, and said end member overlies at least one of said plural detector elements to render said detector element blind to electro-magnetic radiation falling upon said detector.

7. The two-color detector of claim 6 wherein said one end member opaque layer includes a layer of metallization, and said end member overlies at least a single detector element from each one of said two spaced apart parallel adjacent rows of plural detector elements, said end member rendering each of said two detector elements blind.

8. The two-color detector of claim 2 wherein said optical divider wall-like member includes a reflective metallized coating on at least one of a pair of opposite faces thereof.

9. The two-color detector of claim 8 wherein said optical divider wall-like member is fabricated from a material selected from the group including: quartz, and other materials which match a substrate portion of said detector; and which material is transparent to electro-magnetic radiation falling upon said detector, said wall-like member including a reflective metallized coating on each opposite face thereof.

10. The two-color detector of claim 1 further including a thermoelectric cooler having a cooling surface in heat-transfer relation with said detector.

11. The two-color detector of claim 10 wherein said thermoelectric cooler is of multistage design having at least two cascaded stages of semiconductor junctions of reversed Peltier-effect type.

12. The two-color detector of claim 11 further including a thermal housing surrounding all of said infrared detector and said array of photo-conductive detector elements and said thermoelectric cooler.

13. The two-color detector of claim 1 wherein said means for dividing electro-magnetic radiation falling upon said detector into two wavelength bands includes a two-color filter assembly.

14. The two-color detector of claim 13 wherein said two-color filter assembly includes a first filter portion and a separate second filter portion, said portions of said two-color filter defining a line of demarcation congruent with and aligned over said optical divider.

15. The two-color detector of claim 14 wherein said detector further includes a thermal housing receiving said detector and said optical divider, said housing including a window portion which is transparent to and through which said electro-magnetic radiation passed into said housing to fall upon said plural detector elements, said two-color filter assembly being disposed outside of said thermal housing.

16. A method of providing a two-color detector which is responsive to electro-magnetic radiation incident thereon in two different color bands of wavelength for said radiation, said detector providing respective electrical output signals indicative of electromagnetic radiation falling on said detector in each of said two color bands, said method comprising steps of:

provide a detector chip having a linear array of multiple detector elements arranged in two spaced apart parallel adjacent rows each of plural detector elements;

using said detector elements of said detector chip to provide respective electrical output signals in response to electro-magnetic radiation falling thereon;

enclosing said detector chip within a closed housing;

providing a window portion of said housing which is transparent to electro-magnetic radiation causing said electrical response of said detector elements;

providing a two-color filter assembly disposed outwardly of said window portion;

directing electro-magnetic radiation through said two-color filter assembly to provide a pair of electro-magnetic radiation beams each of a respective wavelength color band; and directing said pair of radiation beams through said window portion and onto said detector elements of said detector chip so that substantially only a respective single color of radiation beam falls upon each respective one of said two spaced apart rows of detector elements.

17. The method of claim 16 wherein said step of directing said radiation beams onto said detector elements so that substantially only a single color of radiation falls on each respective one of said rows of detector elements further incudes the steps of providing an optical divider member, and disposing said optical divider member within said housing of said detector.

18. The method of claim 17 further including the step of carrying said optical divider member upon said detector chip.

19. The method of claim 18 wherein said step of carrying said optical divider member upon said detector chip includes the steps of providing a mounting structure upon said detector chip, and using said mounting structure to dispose said optical divider member between and parallel with said two spaced apart parallel adjacent rows each of plural detector elements of said linear array of multiple detector elements.

20. The method of claim 19 wherein said step of providing said mounting structure upon said detector chip includes the steps of providing a pair of spaced apart end members, providing a confronting slot on each of said pair of end members, securing said pair of end members to said detector chip each adjacent to a respective opposite end of said two spaced apart parallel adjacent rows each of plural detector elements, and using said end members to disposed said optical divider member betweens said rows of detector elements and within said confronting slots of said end members.

21. The method of claim 19 wherein said step of providing said mounting structure upon said detector chip includes the steps of providing a pair of spaced apart end members, securing said pair of end members to said detector chip each adjacent to a respective opposite end of said two spaced apart parallel adjacent rows each of plural detector elements, and using at least one of said end members to overly and blind a detector element of a respective one of said rows of plural detector elements in order to prevent said blind detector element from responding to radiation incident upon said detector chip.

22. The method of claim 21 wherein said step of using at least one of said end members to overly and blind a detector element of a respective one of said rows of plural detector elements in order to prevent said blind detector element from responding to radiation incident upon said detector chip includes the step of providing an opaque metallization on a lower surface of said mounting member, and using said opaque metallization to prevent radiation incident upon said detector chip from reaching said blind detector element.

23. The method of claim 18 wherein said step of providing said optical divider member upon said detector chip incudes the steps of fabricating said optical divider member as a wall-like fine-dimensioned structure, using a material having a thermal coefficient of expansion matching closely to that of a substrate of said detector chip, and providing a reflective coating on at least one side surface of said optical divider member to prevent radiation falling on a side surface from reaching detector elements disposed on said detector chip opposite said side surface.

24. The method of claim 23 wherein said step of providing said optical divider member upon said detector chip further includes the step of providing a reflective coating on both side surfaces of said optical divider member to prevent radiation falling on each side surface from reaching detector elements disposed on said detector chip opposite said side surfaces, and using said reflective coatings to trap radiation falling on a top edge surface of said optical divider member therewithin.

25. A two-color detector comprising:

a substantially planar quartz substrate upon which is formed a linear array of multiple PbSe detector elements, said detector elements being arranged in two spaced apart parallel rows which are each adjacent to the other row of detector elements and including a like number of plural detector elements, each detector element of said plural detector elements in response to electro-magnetic radiation falling thereon providing a corresponding one of plural electrical output signals;

conductive means for communicating said electrical output signals individually outwardly of said detector;

means for dividing electro-magnetic radiation falling upon said detector into two wavelength bands; and a wall-like optical divider member interposed between said two spaced apart parallel rows of plural detector elements, said optical divider wall-like member including a reflective metallized coating on at least one of a pair of opposite side surfaces thereof;

a thermal housing receiving said detector and said optical divider, said housing including a window portion which is transparent to and through which said electro-magnetic radiation passed into said housing to fall upon said plural detector elements.

26. The two-color detector of claim 25 further including a pair of spaced apart end members, one of said pair of spaced apart end members being disposed at each end of said two parallel adjacent rows of detector elements, and said pair of end members cooperatively supporting said wall-like optical divider member, one of said pair of end members includes an opaque layer, and said one end member overlying at least one of said plural detector elements to render said detector element blind to electro-magnetic radiation falling upon said detector.

27. The two-color detector of claim 26 wherein said one end member opaque layer includes a layer of metallization, and said end member overlies at least a single detector element from each one of said two spaced apart parallel adjacent rows of plural detector elements, said end member rendering each of said two detector elements blind.

28. The two-color detector of claim 25 wherein said means for dividing electro-magnetic radiation falling upon said detector into two wavelength bands includes a two-color filter assembly disposed outside of said thermal housing.

29. The two-color detector of claim 28 wherein said two-color filter assembly includes a first filter portion and a separate second filter portion, said portions of said two-color filter defining a line of demarcation congruent with and aligned over said optical divider member.

* * * * *